Oct. 18, 1966    H. C. BROWN    3,279,827
HOSE COUPLING CONNECT AND DISCONNECT MECHANISM
Filed March 25, 1964    2 Sheets-Sheet 1
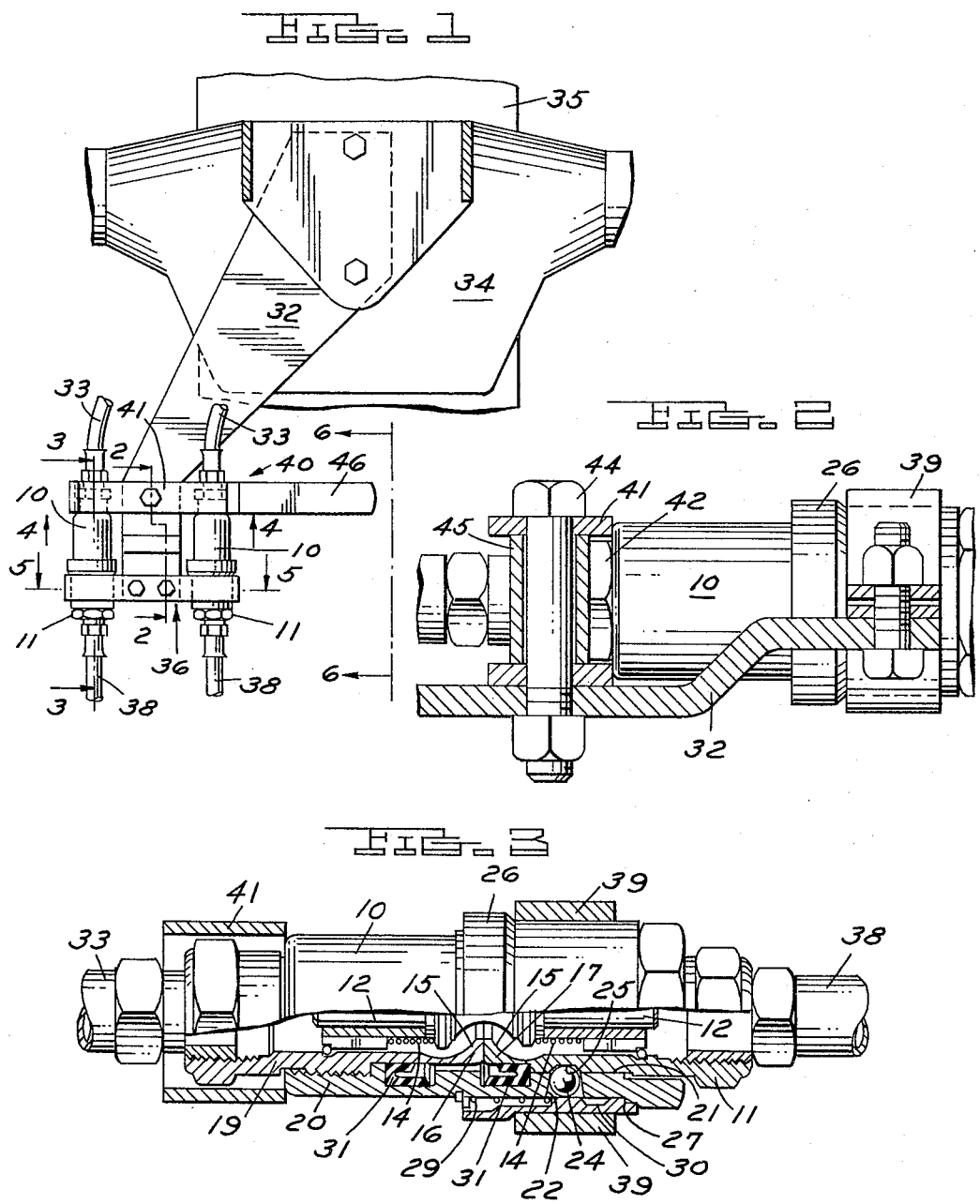
H.C. BROWN
INVENTOR.
BY
P. F. Hilder
ATTORNEY

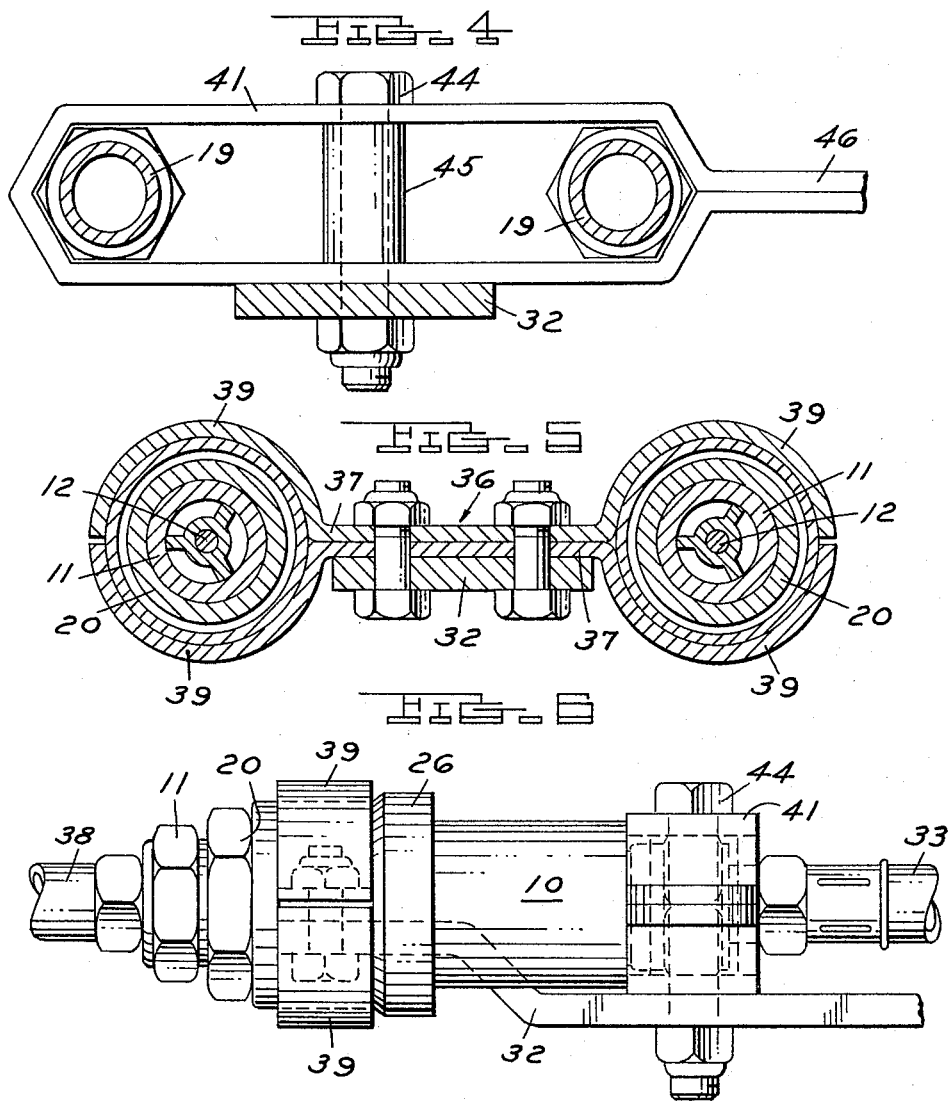

United States Patent Office 3,279,827
Patented Oct. 18, 1966

3,279,827
HOSE COUPLING CONNECT AND DISCONNECT MECHANISM
Hu C. Brown, Rochester, Mich., assignor to Ford Motor Company, Dearborn, Mich., a corporation of Delaware
Filed Mar. 25, 1964, Ser. No. 354,540
3 Claims. (Cl. 285—1)

This invention relates to tractors and, more particularly to apparatus for facilitating the coupling and uncoupling of hydraulic hoses extending to an implement attached to the tractor.

Tractors often are provided with a hydraulic system including a pump and a pressure and return hose for supplying hydraulic fluid under pressure to raise or lower an implement or attachment. The implement is also provided with a pair of hoses for coupling to the hoses of the tractor.

Couplings for joining the hoses of the tractor and implement usually include check valves for retaining the fluid in the hoses upon uncoupling and often include a safety latch that will retain the hoses coupled during normal operation but which will uncouple when subjected to an extraordinary pull as might occur if the implement became uncoupled from the tractor so as to exert a pull on the hydraulic hoses. This safety latch often comprises a plurality of displaceable balls located in slots at intervals about the female coupling half and pressed inwardly by a spring biased sleeve. Upon pull on the hose exceeding a predetermined amount, the coupling will pull apart due to displacement of the sleeve so as to permit the coupling to separate, at which time the check valves will close to prevent loss of hydraulic fluid.

When coupling such a connection, it is necessary to displace the sleeve to insert the male coupling half. Also, as the coupling moves together, the spring-biased check valves are unseated by relative motion of the coupling halves to connect the lines, thus requiring compression not only of the spring bias of the sleeve but also of the two check valve springs. In addition, if there is any hydraulic pressure within either of the lines, additional force is required to unseat the check valves and couple the two coupling halves.

According to the present invention, a pair of couplings of the type described are supported in spaced, side-by-side relation by a support engaging the sleeves of the female coupling halves. A lever is provided for successively displacing the female coupling half of each coupling relative to its sleeve in order to facilitate coupling or uncoupling the male coupling halves. Preferably, the lever is pivotally mounted for rotation about an axis located between the coupling halves, rotation of the lever in one direction displacing one female coupling half relative to its sleeve and rotation in the opposite direction similarly displacing the other female coupling.

Among the objects of the present invention are to provide an improved mechanism for facilitating the coupling and uncoupling of hydraulic hose couplings of the type described; and to provide such a mechanism which will reduce the manual effort required for coupling and uncoupling such couplings, which is simple and dependable in operation, and which will not interfere with automatic safety uncoupling when pull on the coupling exceeds a predetermined force.

Other objects, and objects relating to details of construction and operation will be more apparent from the detailed description to follow.

My invention is clearly defined in the appended claims. In the claims, as well as in the description, parts may at times be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming a part of this specification in which:

FIGURE 1 is a top plan view of the rear portion of the tractor showing a portion of the hydraulic lift cover, center housing and lift arms, and showing a pair of hydraulic hose couplings supported from the tractor by a mechanism according to the present invention.

FIGURE 2 is a vertical section taken generally along the line 2—2 of FIGURE 3.

FIGURE 3 is a vertical section taken along the line 3—3 of FIGURE 1, portions of the support and connect and disconnect mechanism also being shown in vertical section.

FIGURE 4 is a vertical section taken along the line 4—4 of FIGURE 1.

FIGURE 5 is a vertical section taken along the line 5—5 of FIGURE 1.

FIGURE 6 is a right-side elevation of the support and connect and disconnect mechanism, as indicated by the arrows 6—6 of FIGURE 1.

Referring to FIGURE 3, the coupling with which the connect and disconnect mechanism of the present invention is designed to operate is formed of a female coupling half 10 and a male coupling half 11. Each coupling half is provided with a check valve member 12 which is biased by a valve spring 14 into engagement with a valve seat 15. The valve members 12 project beyond the ends of the coupling halves 10 and 11 so that when the confronting portions 16 and 17 of the coupling halves are engaged, the valve members 12 engage with each other and hold the valve members off their seats to establish fluid connection through the coupling. Upon separation of the coupling halves, the members 12 move against their seats so as to close the line and prevent leakage of hydraulic oil and entrance of dirt. This is a conventional type of coupling.

The female coupling half 10 includes an inner body 19 including the valve member 12 and an outer body 20 threadedly engaged with the inner body and extending beyond the inner body to provide a bore 21 for reception of the male coupling half 11. The outer body 20 is provided with a series of holes 22 spaced at intervals around the circumference of the body for reception of steel balls, one ball 24 being shown. A circumferential groove 25 is provided on the outer periphery of the male coupling half 11 for receiving the balls when the coupling halves are completely engaged as shown in FIGURE 3.

A sleeve 26 is provided on the outside of the outer body 20, this sleeve being mounted for reciprocation on that body and biased against a shoulder 27 of the body by a spring 29. When the sleeve 26 is biased forwardly against the shoulder 27, the balls 24 are held within the groove 25 of the coupling half 11 to hold the two coupling halves in engagement against spring pressure and the pressure of the hydraulic fluid.

Upon retracting the sleeve 26 against the bias of the spring 29, a circumferential groove 30 within the sleeve registers with the balls 24 to permit the balls to move radially outwardly and release the male coupling half 11 for uncoupling. Lip-type circumferential oil seals 31 received within the outer body 20 of the female coupling half maintain an oil tight joint. This coupling is generally conventional and a coupling of this same general type is shown in U.S. Patent No. 2,548,528.

The coupling halves 10 are placed on the ends of hoses 33 connected with the tractor hydraulic system (not shown). The coupling halves 11 are received on the ends of a pair of hoses 38 leading to an implement.

Referring now to FIGURE 1, a pair of female coupling halves 10 are supported in spaced, side-by-side relation by a support 32 which for convenience may be bolted to the hydraulic lift cover 34 forming a portion of the tractor center housing 35. Support 32 has a clamp 36 bolted to the rear end thereof, the clamp 36 comprising a pair of straps 37—37 having semi-circular confronting end portions 39 adapted to surround and clampingly receive the sleeve 26 of each coupling (See FIGURE 5).

The arrangement is such that upon excessive pull on either of the hoses 38 the coupling halves 10 and 11 connected to that hose will be pulled rearwardly against the bias of the spring 29, the sleeve 26 moving relative to the outer body 20. When the groove 30 of the sleeve comes opposite the balls 24, the balls will be cammed outwardly by the groove 25 in the male coupling half, thereby releasing the coupling half and preventing damage to the coupling and hose.

According to the present invention, a lever 40 is pivotally mounted on the support 32 for rotation on an axis located between the two female coupling halves 10. The lever 40 has a coupling engaging portion 41 adapted to surround an exposed end portion of the female coupling half inner body 19 (See FIGS. 3 and 4). The portion 41 of the lever abuts end 42 of the coupling half outer body 20 and is a loose fit about a hexagonal portion of the inner body. The lever may be pivotally mounted on the support 32 by a bolt 44 and a spacer 45 surrounding the bolt holds the spaced halves of the coupling engaging portions separated. The lever 40 extends laterally and terminates in a hand engaged portion 46.

The couplings are successively coupled or uncoupled by grasping the portion 46 of the lever and rotating the lever first in one direction and then in the other in order to successively press the female coupling half 10 of each coupling rearwardly relative to its sleeve 26 to register the groove 30 of the sleeve with the balls 24 and permit the male coupling half of each coupling to be inserted or removed as the case may be. The mechanical advantage of the lever serves to displace the sleeve 26 against the bias of spring 29, thereby requiring only displacement of the valve members 12 in order to couple. Uncoupling is accomplished merely by moving the lever, the valve springs 14 tending to separate the two couplings. At the same time, either coupling is free to move rearwardly relative to the lever 40 for safety release of the male coupling half 11.

I claim:

1. In combination with a hose coupling connect and disconnect mechanism, a pair of hose couplings positioned side-by-side, said hose couplings including a male and a female coupling half retained in coupled relation by displaceable balls carried in the female half and engaged with the male half by a spring-biased sleeve mounted for reciprocation on the female half, said mechanism comprising: support means engaged with the sleeve of each coupling and supporting the coupling female halves side-by-side, and a lever pivotally mounted on the support means with the pivot point being between the couplings for rotation in the general plane of the couplings and adapted to engage each female half by rotation of the lever about its pivot first in one direction and then in the opposite direction to relatively displace the sleeve and coupling half of each coupling in turn against the bias and facilitate coupling and uncoupling the male half of each coupling.

2. In combination with a hose coupling connect and disconnect mechanism, a pair of hose couplings positioned side-by-side, said hose couplings including a male and a female coupling half retained in coupled relation by displaceable balls carried in the female half and engaged with the male half by a spring-biased sleeve mounted for reciprocation on the female half, said mechanism comprising: support means engaged with the sleeve of each coupling and supporting the coupling female halves side-by-side with each coupling extending generally horizontally, and a lever pivotally mounted on the support means with the pivot point being between the coupling female halves for rotation in the general plane of the couplings and adapted to telescopically engage about each female half in turn by rotation of the lever about its pivot to displace the female coupling half against its bias and facilitate coupling and uncoupling the male half of each coupling.

3. In combination with a hose coupling of the type having a male and female coupling half retained in coupled relation by displaceable balls carried in the female half and cammed into engagement with the male half by a spring-biased sleeve slidably mounted on the female half, the female half being mounted on a rigid support by a clamp secured to said support and engaged about the coupling sleeve, said clamp preventing relative motion between said sleeve and said support whereby the balance of the female half may move rearwardly with the male half upon overload pull upon the male half of the coupling to cause relative motion of the sleeve against its bias and cause uncoupling of the coupling responsive to said overload, and a lever pivotally mounted on the support and having a bifurcated portion engageable about a portion of the female coupling remote from the sleeve and abutting a radially extending portion of the female half between the sleeve and said bifurcated portion, operation of the lever serving to reciprocate the balance of the coupling relative to and against the bias of the sleeve for facilitating manually coupling and uncoupling the male coupling half and movement of the balance of the coupling relative to the sleeve responsive to overload moving the abutting portion of the female coupling half away from the lever.

References Cited by the Examiner

UNITED STATES PATENTS

| | | | |
|---|---|---|---|
| 1,356,215 | 10/1920 | Meyer | 285—310 |
| 2,788,991 | 4/1957 | Neuhauser | 285—310 X |
| 2,806,716 | 9/1957 | Brown | 285—307 X |
| 2,894,763 | 7/1959 | Karnath | 339—45 |
| 2,930,633 | 3/1960 | Ethington | 285—277 X |
| 3,011,805 | 12/1961 | Johnson | 285—312 X |
| 3,125,359 | 3/1964 | Charles | 285—1 |
| 3,140,102 | 7/1964 | Johnson | 285—1 X |

FOREIGN PATENTS 299,450  6/1954  Switzerland.

CARL W. TOMLIN, *Primary Examiner.*

R. GIANGIORGI, *Assistant Examiner.*